United States Patent
Kim et al.

(10) Patent No.: US 9,042,339 B2
(45) Date of Patent: May 26, 2015

(54) SYSTEM AND METHOD FOR SUPPORTING ROBUST HEADER COMPRESSION IN WIRELESS COMMUNICATION SYSTEM

(75) Inventors: Dae-Hee Kim, Seoul (KR); Wi-Jun Lee, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 530 days.

(21) Appl. No.: 12/807,335

(22) Filed: Sep. 2, 2010

(65) Prior Publication Data
US 2011/0058530 A1   Mar. 10, 2011

(30) Foreign Application Priority Data
Sep. 7, 2009   (KR) .................... 10-2009-0084123

(51) Int. Cl.
- H04W 36/12 (2009.01)
- H04W 28/06 (2009.01)
- H04W 36/00 (2009.01)

(52) U.S. Cl.
CPC .......... *H04W 36/0055* (2013.01); *H04W 28/06* (2013.01); *H04W 36/12* (2013.01)

(58) Field of Classification Search
CPC . H04W 36/0033; H04W 36/16; H04W 36/12; H04L 29/0604
USPC .......... 370/331, 474, 477; 455/436, 437, 438, 455/439, 442, 444
See application file for complete search history.

(56) References Cited

U.S. PATENT DOCUMENTS

| | | | |
|---|---|---|---|
| 2004/0264433 A1* | 12/2004 | Melpignano | 370/349 |
| 2007/0254661 A1* | 11/2007 | Chowdhury et al. | 455/436 |
| 2008/0240439 A1* | 10/2008 | Mukherjee et al. | 380/272 |
| 2009/0080374 A1* | 3/2009 | Lee et al. | 370/328 |
| 2009/0116445 A1* | 5/2009 | Samar et al. | 370/331 |

* cited by examiner

*Primary Examiner* — Ayaz Sheikh
*Assistant Examiner* — Tarell Hampton

(57) ABSTRACT

A system and method support robust header compression (ROHC) for a mobile station (MS) handover in a wireless communication system. If a mobile station (MS) accesses a base station (BS) controlled by the ASN-GW through a handover, ROHC parameter information is received from a previous ASN-GW controlling a previous BS accessed by the MS before the handover. An ROHC parameter for ROHC-based communication with the MS is determined on the basis of the ROHC parameter information received from the previous ASN-GW. The determined ROHC parameter is transmitted to the MS by using a path modification request message for an ROHC service flow.

26 Claims, 16 Drawing Sheets

SYSTEM AND METHOD FOR SUPPORTING ROBUST HEADER COMPRESSION IN WIRELESS COMMUNICATION SYSTEM

CROSS-REFERENCE TO RELATED APPLICATION(S) AND CLAIM OF PRIORITY

This application is related to and claims priority under 35 U.S.C. §119 to an application filed in the Korean Intellectual Property Office on Sep. 7, 2009 and assigned Serial No. 10-2009-0084123, the contents of which are incorporated herein by reference.

TECHNICAL FIELD OF THE INVENTION

The present invention relates generally to a system and method for supporting robust header compression (ROHC) in a wireless communication system and, in particular, to a system and method for supporting ROHC for a mobile station (MS) handover in a wireless communication system without exchanging context information.

BACKGROUND OF THE INVENTION

Unlike wired links, wireless links have high error rates and thus require the technique of processing a wireless link signal in an error-robust manner. Also, since packet transmission resources are limited, the wireless links may reduce a resource loss through a header compression technique. Examples of the header compression technique include a robust header compression (ROHC) technique.

In an ROHC technique, a transmitting end transmits only changeable information among the information included in a header to a receiving end on the basis of the context of configuring a packet dynamically during transmission for header compression. The receiving end may restore the compressed header on the basis of the context information.

A mobile station (MS) may change an access service network gateway (ASN-GW) through a handover. Hereinafter, a handover changing an ASN-GW of an MS will be referred to as an inter ASN-GW handover.

In an inter ASN-GW handover, a serving ASN-GW transmits the context information and the ROHC parameter of an MS to a target ASN-GW by means of ROHC such that the target ASN-GW and the MS may communicate traffic data therebetween.

As described above, the serving ASN-GW transmits the context information and the ROHC parameter to the target ASN-GW in the inter ASN-GW handover of the MS.

If the serving ASN-GW and the target ASN-GW have different ROHC capabilities, they may use different ROHC parameters. Accordingly, the target ASN-GW may fail to perform the ROHC with the MS by means of the ROHC parameter received from the serving ASN-GW.

Also, the serving ASN-GW requires many resources to transmit the context information. Accordingly, in the inter ASN-GW handover of the MS, the serving ASN-GW may fail to transmit the context information to the target ASN-GW in an IP packet format together with other information.

SUMMARY OF THE INVENTION

An object of the present invention is to substantially solve at least the above problems and/or disadvantages and to provide at least the advantages below. Accordingly, an object of the present invention is to provide a system and method for supporting ROHC for an inter ASN-GW handover of an MS in a wireless communication system without exchange of context information.

Another object of the present invention is to provide a system and method for supporting ROHC for an MS handover between ASN-GWs with different ROHC capabilities in a wireless communication system.

Another object of the present invention is to provide a system and method for supporting a handover between an ASN-GW that supports ROHC and an ASN-GW that does not support ROHC in a wireless communication system.

Another object of the present invention is to provide a system and method for supporting ROHC for a handover between ASN-GWs with the same ROHC capability in a wireless communication system by exchange of only ROHC mode information.

According to an aspect of the present invention, a method for ROHC in an ASN-GW of a wireless communication system includes receiving, if an MS accesses a base station (BS) controlled by the ASN-GW through a handover, ROHC parameter information from a previous ASN-GW that controls a previous BS accessed by the MS before the handover. An ROHC parameter for ROHC-based communication with the MS is determined on the basis of the ROHC parameter received from the previous ASN-GW. The determined ROHC parameter is transmitted to the MS by using a dynamic service change request message for an ROHC service flow.

According to another aspect of the present invention, a method for supporting ROHC in an MS when an ASN-GW is changed through a handover in a wireless communication system includes determining whether a dynamic service change request message for an ROHC service flow is received from a BS accessed through the handover. Context information for ROHC is reset if the dynamic service change request message is received. And a dynamic service change response message for the ROHC service flow is transmitted to the BS.

According to another aspect of the present invention, a wireless communication system for supporting ROHC includes a second ASN-GW that receives ROHC parameter information from a first ASN-GW if an MS is handed over from a first BS controlled by the first ASN-GW to a second BS controlled by the second ASN-GW, and transmits an ROHC parameter to the MS by using a dynamic service change request message for an ROHC service flow. The MS detects an ROHC parameter included in the dynamic service change request message if the MS receives the dynamic service change request message, and resets context information of ROHC, wherein communication traffic occurs between the second ASN-GW and the MS, the second ASN-GW and the MS perform communication by generating a context on the basis of the ROHC parameter.

According to another aspect of the present invention, a method for supporting ROHC in an ASN-GW of a wireless communication system includes receiving, if an MS accesses a BS controlled by the ASN-GW through a handover, ROHC mode information and ROHC parameter information from a previous ASN-GW that controls a previous BS accessed by the MS before the handover. Context information is initialized by using the ROHC mode information. And the context information is updated through communication with the MS.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE INVENTION

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communications system. Preferred embodiments of the present invention will be described herein below with reference to the accompanying drawings. In the following description, well-known functions or constructions are not described in detail since they would obscure the invention in unnecessary detail. Terms described below, which are defined considering functions in the present invention, can be different depending on user and operator's intention or practice. Therefore, the terms should be defined on the basis of the disclosure throughout this specification.

Embodiments of the present invention provide a technique for supporting a selective suspend mode in a Universal Serial Bus (USB) composite network device. Herein, the selective suspend mode is supported only in some of the devices of the composite network device in an idle mode. That is, the selective suspend mode is supported only in some of the devices in the idle mode, compared to the idle mode in which the entire composite network device operates in the idle mode.

The present invention provides a scheme for supporting an inter ASN-GW handover in a wireless communication system. Herein, the inter ASN-GW handover means a handover that changes a serving ASN-GW of the MS through an MS handover.

In the following description, a serving base station (BS) means a BS accessed by an MS before a handover, and a target BS means a BS accessed by the MS through the handover. Also, a serving ASN-GW means an ASN-GW controlling the serving BS, and a target ASN-GW means an ASN-GW controlling the target BS.

In the following description, it is assumed that the inter ASN-GW handover includes any inter ASN-GW handover that performs a relocation process. Examples of the inter ASN-GW handover include an active inter ASN-GW handover, an idle inter ASN-GW handover, and an idle inter ACR (Access Control Router) handover.

Figure 1:
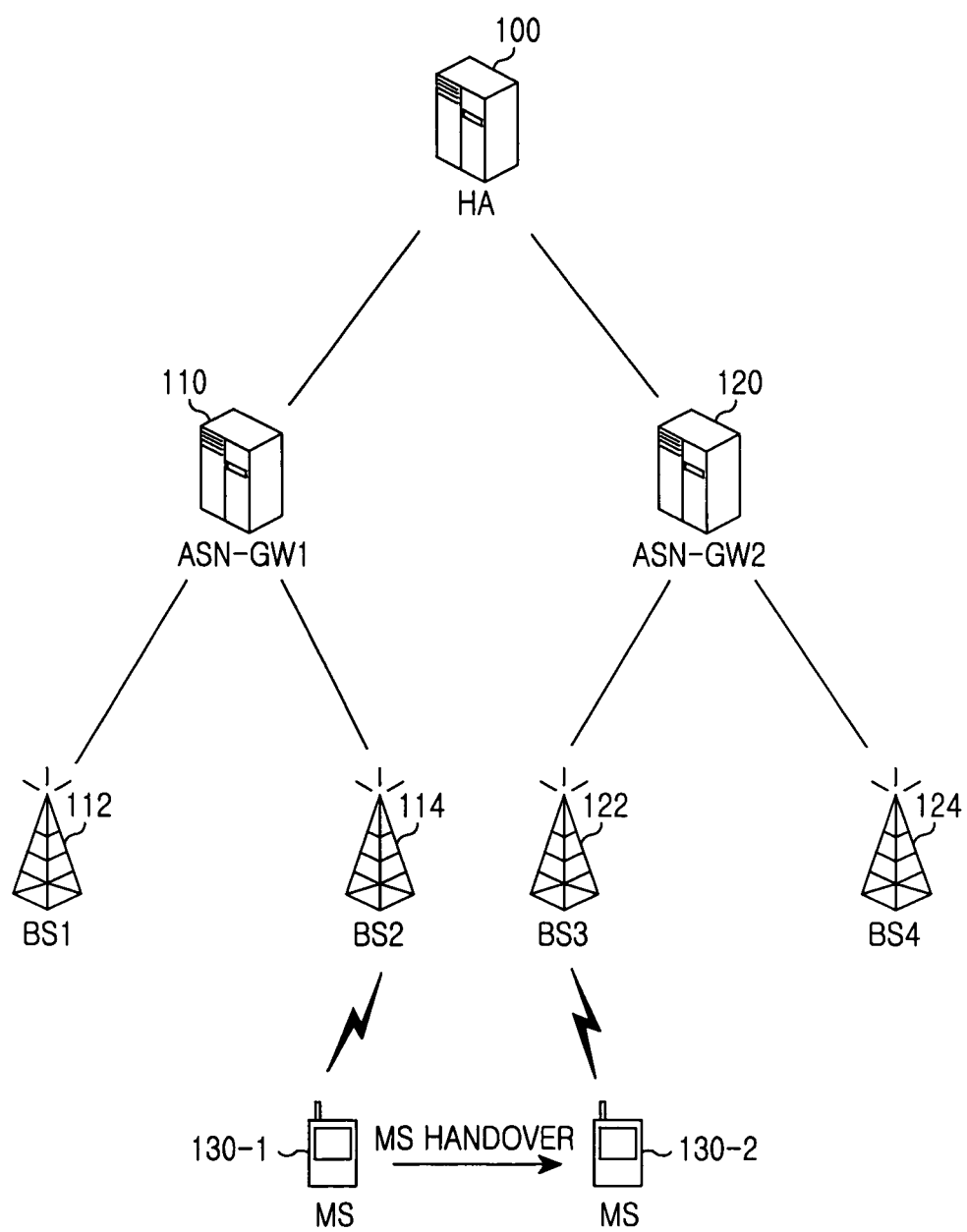
FIG. 1 illustrates an inter ASN-GW handover in a wireless communication system according to an embodiment of the present invention.

FIG. 1 illustrates an inter ASN-GW handover in a wireless communication system according to an embodiment of the present invention. Herein, FIG. 1 exemplifies the IEEE 802.16 standards.

Referring to FIG. 1, a wireless communication system includes a home agent (HA) 100, ASN-GWs 110 and 120, BSs 112, 114, 122 and 124, and an MS 130.

When the MS 130 accessing the second BS 114 is handed over to the third BS 122, the second BS 114 and the third BS 122 are connected to different ASN-GWs. Accordingly, the MS 130 performs an inter ASN-GW handover that changes an ASN-GW through a handover.

As described above, when the MS performs an inter ASN-GW handover, the wireless communication system supports an inter ASN-GW handover in order to support ROHC, as illustrated in FIG. 1. In the following description, it is assumed that a serving ASN-GW and a target ASN-GW support ROHC.

Figure 2:
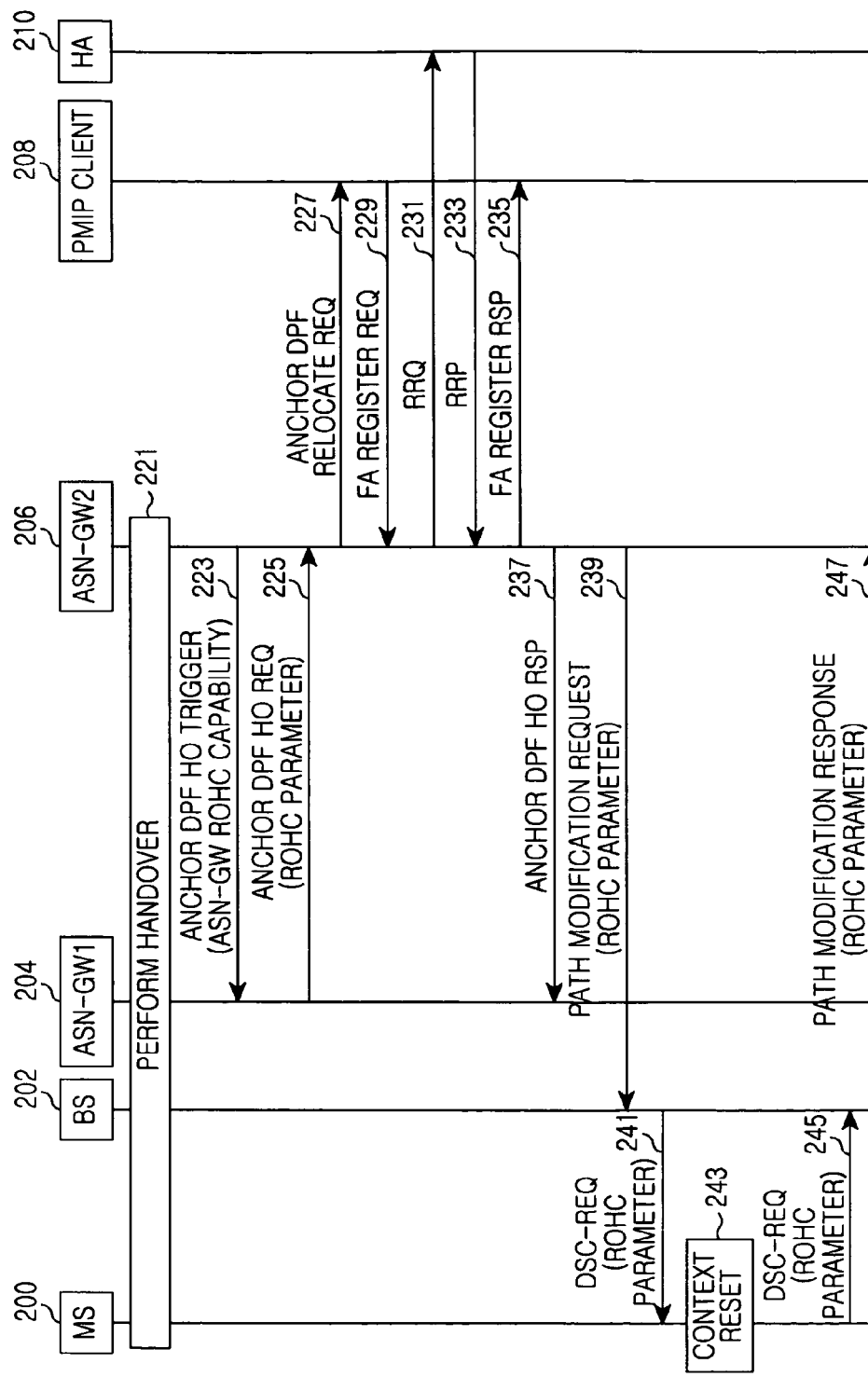
FIG. 2 illustrates a handover process between ASN-GWs supporting ROHC in a wireless communication system, according to an embodiment of the present invention.

FIG. 2 illustrates a handover process between ASN-GWs supporting ROHC in a wireless communication system, according to an embodiment of the present invention.

Referring to FIG. 2, an MS 200 is handed over from a BS controlled by a first ASN-GW 204 to a BS 202 controlled by a second ASN-GW 206 (block 221). That is, the MS 200 performs an inter ASN-GW handover. Herein, the first ASN-GW 204 is a serving ASN-GW and the second ASN-GW 206 is a target ASN-GW.

The second ASN-GW 206 transmits an inter-ASN handover trigger message 223 (Anchor_DPF_HO_Trigger) to the first ASN-GW 204 for foreign agent (FA) relocation or data path establishment with a home agent (HA) 210. Herein, the inter-ASN handover trigger message includes ROHC capability information of the second ASN-GW 206. The ROHC capability information includes information about whether the second ASN-GW 206 supports ROHC.

Based on to the inter-ASN handover trigger message, the first ASN-GW 204 transmits an inter-ASN handover request message (Anchor_DPF_HO_Req 225) to the second ASN-GW 206. Herein, the inter-ASN handover request message includes ROHC parameters used for ROHC with the MS 200. For example, the ROHC parameters include MAX_CID, LARGE_CID, PROFILE, FEEDBACK_FOR, and MRRU.

Upon receiving the inter-ASN handover request message, the second ASN-GW 206 transmits a FA relocation request message (Anchor_DPF_Relocate_Req 227) to a proxy mobile IP (PMIP) client 208 for FA relocation. Herein, the FA relocation request message includes the care of address (CoA) of the first ASN-GW 204 and the CoA of the second ASN-GW 206.

On the basis of the CoA of the first ASN-GW 204 included in the FA relocation request message, the PMIP client 208 determines whether to accept the FA relocation request of the second ASN-GW 206. If accepting the FA relocation request of the second ASN-GW 206, the PMIP client 208 transmits an FA registration request message (FA_Register_Req 229) to the second ASN-GW 206.

Based on the FA registration request message, the second ASN-GW 206 transmits a registration request message (RRQ 231) to the HA 210 for a mobile IP (MIP) registration of the MS 200.

The HA 210 transmits a registration reply message (RRP 233) to the second ASN-GW 206 in order to notify a new MIP registration to the second ASN-GW 206.

The second ASN-GW 206 transmits an FA registration response message (FA Register Rsp 235) including the registration reply message to the PMIP client 208. Herein, the PMIP client 208 stores a new FA, detected from the FA registration response message, in its own database.

Also, when receiving the registration reply message, the second ASN-GW 206 transmits a data path establishment completion message (Anchor_DPF_HO_Rsp 237) to the first ASN-GW 204. Herein, through the data path establishment completion message, the second ASN-GW 206 notifies the success/failure of data path establishment to the first ASN-GW 204.

If the MS 200 supports ROHC, the second ASN-GW 206 transmits a path modification request message (Path Modification Request 239) to the BS 202 for traffic communication with the MS 200 by means of ROHC. For example, the second ASN-GW 206 is unaware of the context information used by the MS 200 for ROHC-based traffic communication with the first ASN-GW 204. Accordingly, the second ASN-GW 206 transmits a path modification request message to the BS 202 for conformity with the context information of the MS. Herein, the path modification request message includes an ROHC parameter that will be used by the second ASN-GW 206 to perform ROHC.

According to the path modification request message, the BS 202 transmits a dynamic service change request message (DSC-REQ 241) for an ROHC service flow to the MS 200. Herein, the dynamic service change request message includes an ROHC parameter that will be used by the second ASN-GW 206 to perform ROHC.

When receiving the dynamic service change request message for an ROHC service flow, the MS 200 resets the context information for ROHC (block 243). Herein, the MS 200 determines whether to accept the ROHC parameter included in the dynamic service change request message.

Thereafter, the MS 200 transmits a dynamic service change response message (DSC-RSP 245) to the BS 202. Herein, the dynamic service change response message includes information about whether the MS 200 accepts the ROHC parameter.

According to the dynamic service change response message, the BS 202 transmits a path modification response message (Path Modification Response 247) to the second ASN-GW 206.

If the MS 200 accepts the ROHC parameter, when traffic occurs, the second ASN-GW 206 and the MS 200 construct a new context by means of the ROHC parameter to perform ROHC-based communication.

Figure 3:
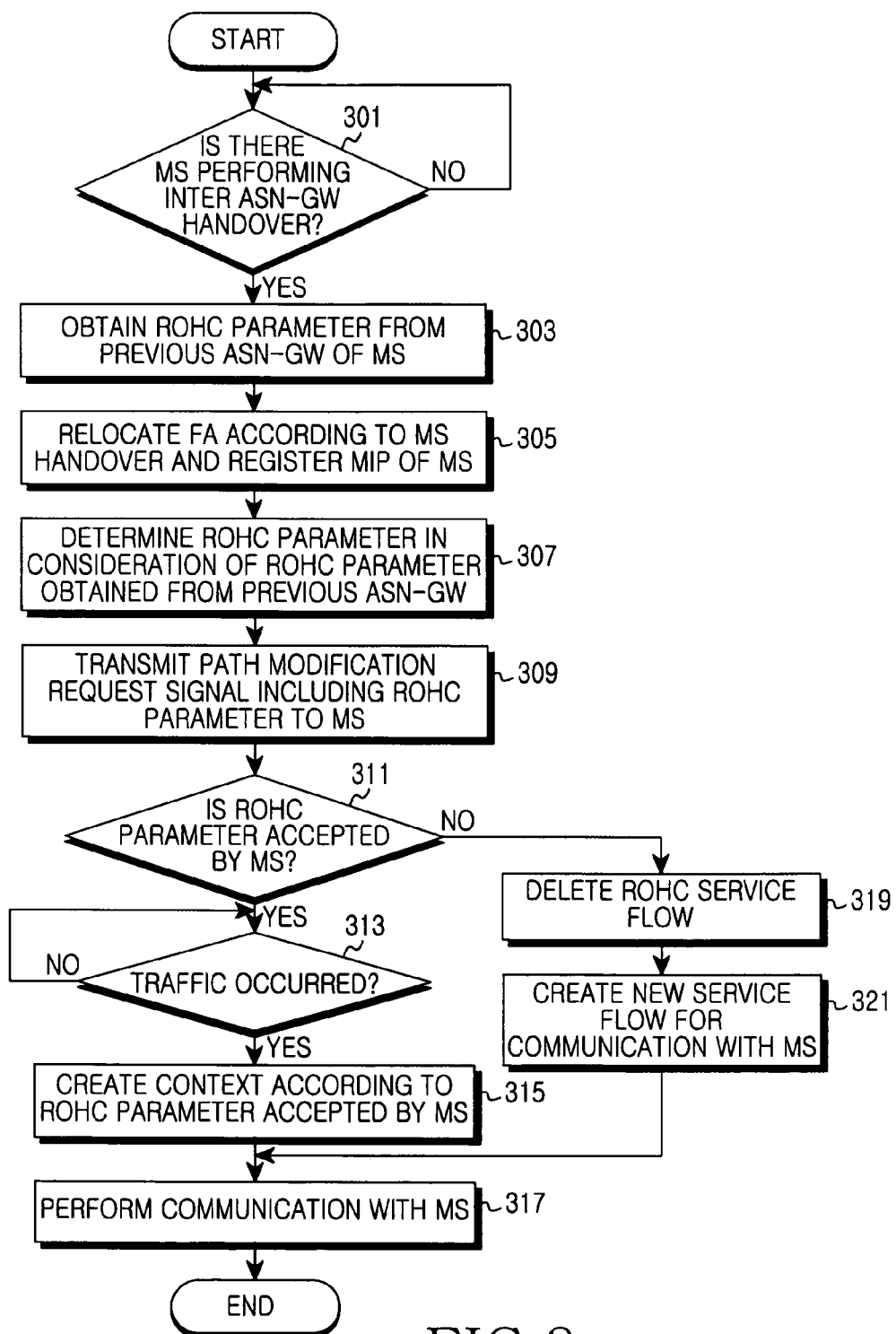
FIG. 3 illustrates a process for supporting a handover of an MS in an ASN-GW supporting ROHC, according to an embodiment of the present invention.

For the inter ASN-GW handover, the target ASN-GW supporting ROHC operates as illustrated in FIG. 3.

FIG. 3 illustrates a process for supporting a handover of an MS in an ASN-GW supporting ROHC, according to an embodiment of the present invention.

Referring to FIG. 3, in block 301, the ASN-GW determines whether there is an MS performing an inter ASN-GW handover to access a BS controlled by the ASN-GW itself.

If there is an MS performing the inter ASN-GW handover, the ASN-GW proceeds to block 303. In block 303, the ASN-GW detects an ROHC parameter used by a serving ASN-GW for ROHC-based communication with the MS. For example, the ASN-GW obtains the ROHC parameter from the serving ASN-GW as illustrated in FIG. 2.

After obtaining the ROHC parameter, the ASN-GW proceeds to block 305. In block 305, the ASN-GW performs FA relocation and MIP registration of the MS according to an inter ASN-GW handover of the MS. For example, the ASN-GW performs the FA relocation and the MIP registration of the MS as illustrated in FIG. 2.

Thereafter, in block 307, on the basis of the ROHC parameter obtained from the serving ASN-GW, the ASN-GW determines the ROHC parameter that will be used by the ASN-GW itself for ROHC-based communication with the MS.

After determining the ROHC parameter, the ASN-GW proceeds to block 309. In block 309, the ASN-GW transmits a path modification request message in order to perform ROHC-based communication with the MS. For example, the ASN-GW is unaware of the context information used by the MS for ROHC-based communication with the serving ASN-GW. Accordingly, the ASN-GW transmits a path modification request message to the BS, accessed by the MS through a handover, for conformity with the context information of the MS. Herein, the path modification request message includes the ROHC parameter determined by the ASN-GW.

Thereafter, in block 311, the ASN-GW determines whether the MS has accepted the ROHC parameter determined by the ASN-GW itself. For example, as illustrated in FIG. 3, the ASN-GW determines whether the MS has accepted the ROHC parameter, determined in block 307 by the ASN-GW itself, on the basis of a path modification response message received from the BS accessed by the MS through a handover.

If the MS has accepted the ROHC parameter, the ASN-GW proceeds to block 313. In block 313, the ASN-GW determines whether traffic for the MS occurs.

If traffic for the MS occurs, the ASN-GW proceeds to block 315. In block 315, the ASN-GW generates a new context by using the ROHC parameter determined in block 307.

Thereafter, in block 317, the ASN-GW 317 communicates with the MS by using the new context information.

On the other hand, if the MS has not accepted the ROHC parameter (in block 311), the ASN-GW proceeds to block 319. In block 319, the ASN-GW deletes an ROHC service flow with the MS.

After deleting the ROHC service flow, the ASN-GW proceeds to block 321. In block 321, the ASN-GW creates a new service flow for communication with the MS.

Thereafter, in block 317, the ASN-GW communicates with the MS by using the new service flow.

In the above embodiment, if traffic for the MS occurs, the ASN-GW creates a new context by using the ROHC parameter determined in block 307.

In one embodiment, if traffic for the ASN-GW occurs, the MS creates a new context by using the ROHC parameter determined in block 307.

Figure 4:
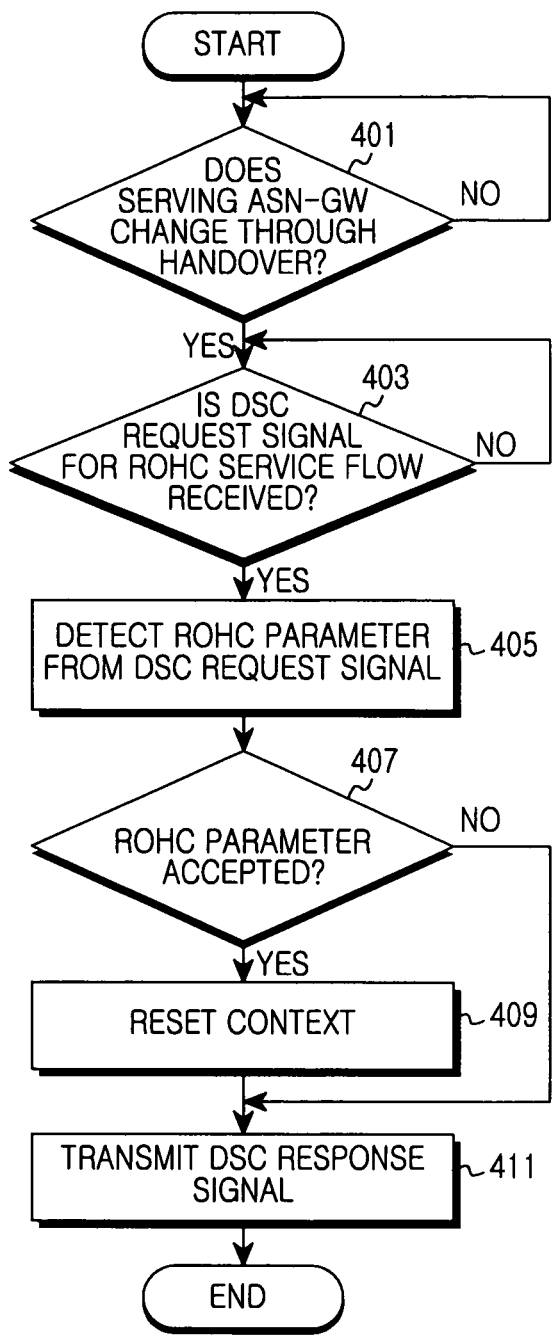
FIG. 4 illustrates a process for a handover of an MS to an ASN-GW supporting ROHC, according to an embodiment of the present invention.

The MS resets the context information according to the ROHC of the target ASN-GW as illustrated in FIG. 4.

FIG. 4 illustrates a process for a handover of an MS to an ASN-GW supporting ROHC, according to an embodiment of the present invention.

Referring to FIG. 4, in block 401, the MS determines whether an ASN-GW changes through a handover. That is, the MS determines whether an ASN-GW controlling a serving BS is identical to an ASN-GW controlling a target BS.

If an ASN-GW controlling a serving BS is different from an ASN-GW controlling a target BS, the MS determines that an ASN-GW changes through the handover. In block 403, the MS determines whether a dynamic service change request signal for an ROHC service flow is received from the target BS.

If a dynamic service change request signal for an ROHC service flow is received from the target BS, the MS proceeds to block 405. In block 405, the MS detects an ROHC parameter included in the dynamic service change request signal. Herein, the ROHC parameter included in the dynamic service change request signal includes an ROHC parameter to be used by a target ASN-GW.

Thereafter, in block 407, the MS determines whether to accept the detected ROHC parameter. That is, the MS determines whether ROHC is supportable by the ROHC parameter.

If the ROHC parameter is unacceptable, the MS proceeds to block 411. In block 411, the MS transmits a dynamic service change response signal including the ROHC parameter unacceptability information to the target BS.

On the other hand, if the ROHC parameter is acceptable, the MS proceeds to block 409. In block 409, the MS resets context information for ROHC.

After resetting the context information, the MS proceeds to block 411. In block 411, the MS transmits a dynamic service change response signal including the ROHC parameter acceptability information to the target BS.

Thereafter, the MS ends the process.

As described above, after transmitting the dynamic service change response message, the MS creates a context on the basis of the ROHC parameter if there is traffic to be communicated with the target BS (or the target ASN-GW). Thereafter, the MS communicates the traffic with the target BS (or the target ASN-GW) on the basis of the created context.

In the above embodiment, the MS resets the context information according to the acceptability/unacceptability of the ROHC parameter.

Figure 5:
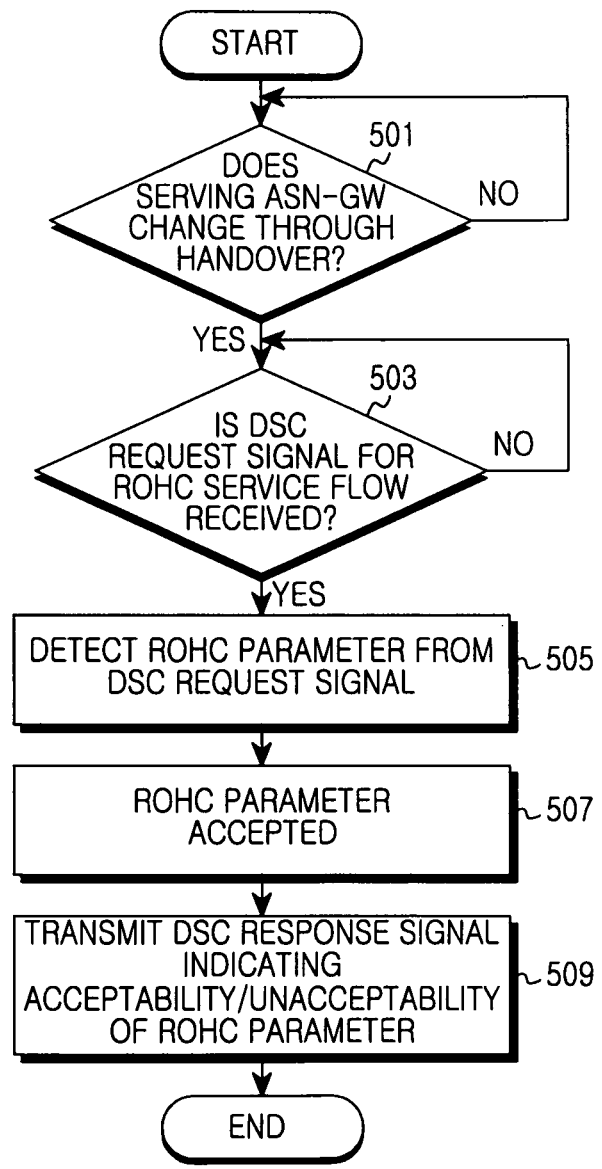
FIG. 5 illustrates a process for a handover of an MS to an ASN-GW supporting ROHC, according to an embodiment of the present invention.

In an embodiment, the MS may reset the context information according to the reception/non-reception of the dynamic service change request signal as illustrated in FIG. 5.

FIG. 5 illustrates a process for a handover of an MS to an ASN-GW supporting ROHC, according to an embodiment of the present invention.

Referring to FIG. 5, in block 501, the MS determines whether an ASN-GW changes through a handover. That is, the MS determines whether an ASN-GW controlling a serving BS is identical to an ASN-GW controlling a target BS.

If an ASN-GW controlling a serving BS is different from an ASN-GW controlling a target BS, the MS determines that an ASN-GW changes through the handover. In block 503, the MS determines whether a dynamic service change request signal for an ROHC service flow is received from the target BS.

If a dynamic service change request signal for an ROHC service flow is received from the target BS, the MS proceeds to block 505. In block 505, the MS detects an ROHC parameter included in the dynamic service change request signal. Herein, the ROHC parameter included in the dynamic service change request signal includes an ROHC parameter to be used by a target ASN-GW.

Thereafter, in block 507, the MS resets context information for ROHC.

After resetting the context information, the MS proceeds to block 509. In block 509, the MS transmits a dynamic service change response signal indicating the acceptability/unacceptability of the ROHC parameter. That is, the dynamic service change response signal includes information about whether the MS can support ROHC by using the ROHC parameter.

Thereafter, the MS ends the process.

As described above, after transmitting the dynamic service change response message, the MS creates a context on the basis of the ROHC parameter if there is traffic to be communicated with the target BS (or the target ASN-GW). Thereafter, the MS communicates the traffic with the target BS (or the target ASN-GW) on the basis of the created context.

As illustrated in FIGS. 4 and 5, the MS determines only the acceptability/unacceptability of the ROHC parameter determined by the ASN-GW. As another example, the MS may negotiate a ROHC parameter with the target ASN-GW on the basis of the ROHC parameter determined by the target ASN-GW.

Figure 6:
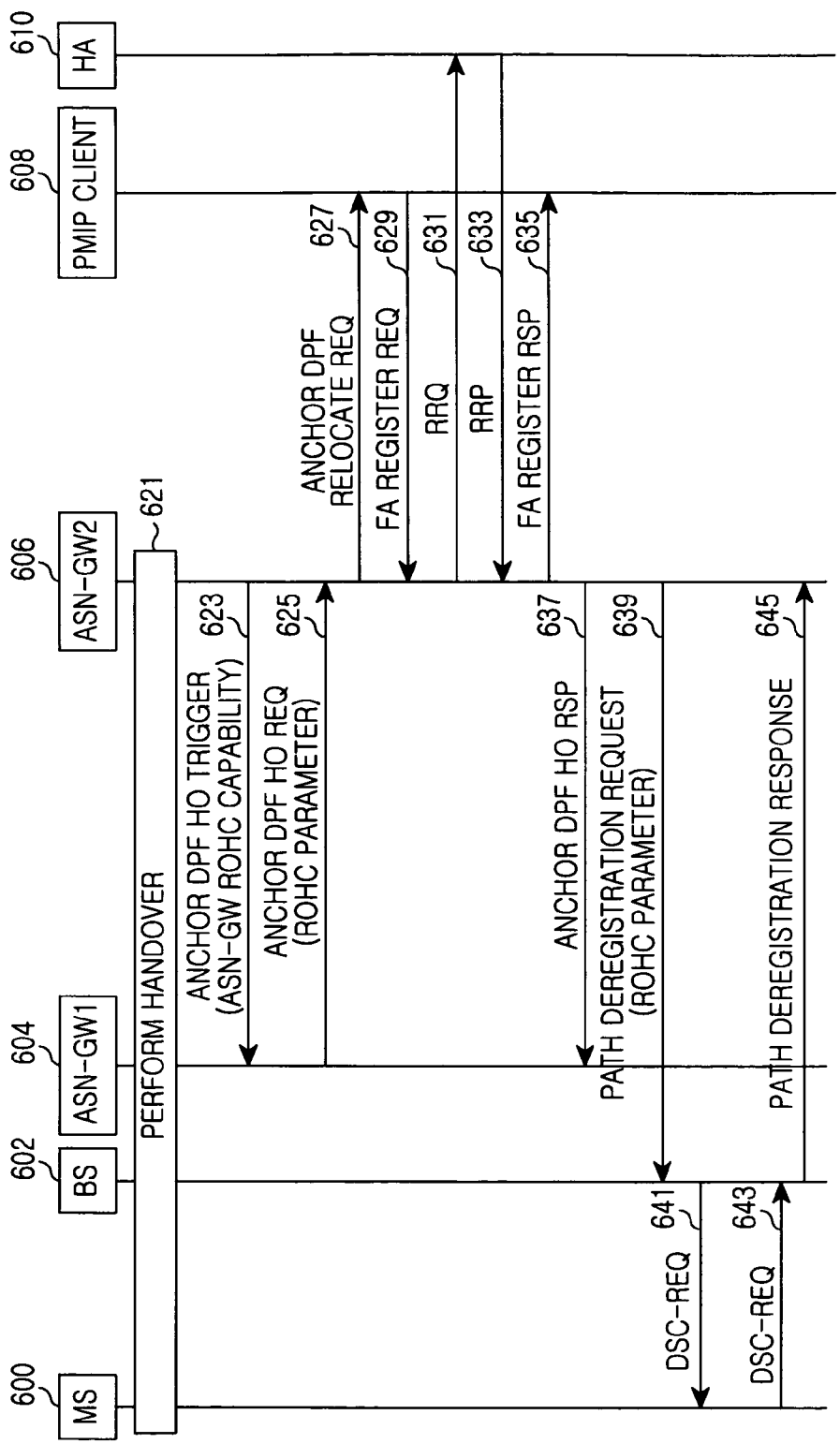
FIG. 6 illustrates a handover process between an ASN-GW supporting ROHC and an ASN-GW unsupporting ROHC in a wireless communication system, according to an embodiment of the present invention.

If a handover occurs between an ASN-GW supporting ROHC and an ASN-GW unsupporting ROHC, the wireless communication system supports an inter ASN-GW handover as illustrated in FIG. 6.

FIG. 6 illustrates a handover process between an ASN-GW supporting ROHC and an ASN-GW unsupporting ROHC in a wireless communication system, according to an embodiment of the present invention.

Referring to FIG. 6, an MS 600 is handed over from a BS controlled by a first ASN-GW 604 to a BS 602 controlled by a second ASN-GW 606 (block 621). That is, the MS 600 performs an inter ASN-GW handover. Herein, the first ASN-GW 604 is a serving ASN-GW and the second ASN-GW 606 is a target ASN-GW.

The second ASN-GW 606 transmits an inter-ASN handover trigger message (Anchor_DPF_HO_Trigger 623) to the first ASN-GW 604 for foreign agent (FA) relocation or data path establishment with a home agent (HA) 610. Herein, the inter-ASN handover trigger message includes ROHC capability information of the second ASN-GW 606. That is, the second ASN-GW 606 transmits the capability information unsupporting ROHC to the first ASN-GW 604.

According to the inter-ASN handover trigger message, the first ASN-GW 604 transmits an inter-ASN handover request message (Anchor_DPF_HO_Req 625) to the second ASN-GW 606. Herein, the inter-ASN handover request message includes ROHC parameters used for ROHC with the MS 600.

Upon receiving the inter-ASN handover request message, the second ASN-GW 606 transmits a FA relocation request message (Anchor_DPF_Relocate_Req 627) to a proxy mobile IP (PMIP) client 608 for FA relocation. Herein, the FA relocation request message includes the care of address (CoA) of the first ASN-GW 604 and the CoA of the second ASN-GW 606.

On the basis of the CoA of the first ASN-GW 604 included in the FA relocation request message, the PMIP client 608 determines whether to accept the FA relocation request of the second ASN-GW 606. If accepting the FA relocation request of the second ASN-GW 606, the PMIP client 608 transmits an FA registration request message (FA_Register_Req 629) to the second ASN-GW 606.

According to the FA registration request message, the second ASN-GW 606 transmits a registration request message (RRQ 631) to the HA 610 for MIP registration of the MS 600.

The HA 610 transmits a registration reply message (RRP 633) to the second ASN-GW 606 in order to notify a new MIP registration to the second ASN-GW 606.

The second ASN-GW 606 transmits an FA registration response message (FA Register Rsp 635) including the registration reply message to the PMIP client 608. Herein, the PMIP client 608 stores a new FA, detected from the FA registration response message, in its own database.

Also, when the registration reply message is received, the second ASN-GW 606 transmits a data path establishment completion message (Anchor_DPF_HO_Rsp 637) to the first ASN-GW 604. Herein, through the data path establishment completion message, the second ASN-GW 606 notifies the success/failure of data path establishment to the first ASN-GW 604.

After completion of the above relocation process, since the second ASN-GW 606 does not support ROHC, it transmits a path deregistration request message (Path Deregistration Request 639) to the BS 602 in order to delete an ROHC service flow with the MS 600. Herein, the path deregistration request message includes ID information of an ROHC service flow.

According to the path deregistration request message, the BS 602 transmits a dynamic service deletion request message (DSD-REQ 641) for an ROHC service flow to the MS 600.

The MS 600 deletes the ROHC service flow according to the dynamic service deletion request message (DSD-REQ) for the ROHC service flow.

Thereafter, the MS 600 transmits a dynamic service deletion response message (DSD-RSP 643) to the BS 602.

According to the dynamic service deletion response message, the BS 602 transmits a path deregistration response message (Path Deregistration Response 645) to the second ASN-GW 606.

Thereafter, the second ASN-GW 606 and the MS 600 perform communication by creating a new service flow through a dynamic service creation process.

Figure 7:
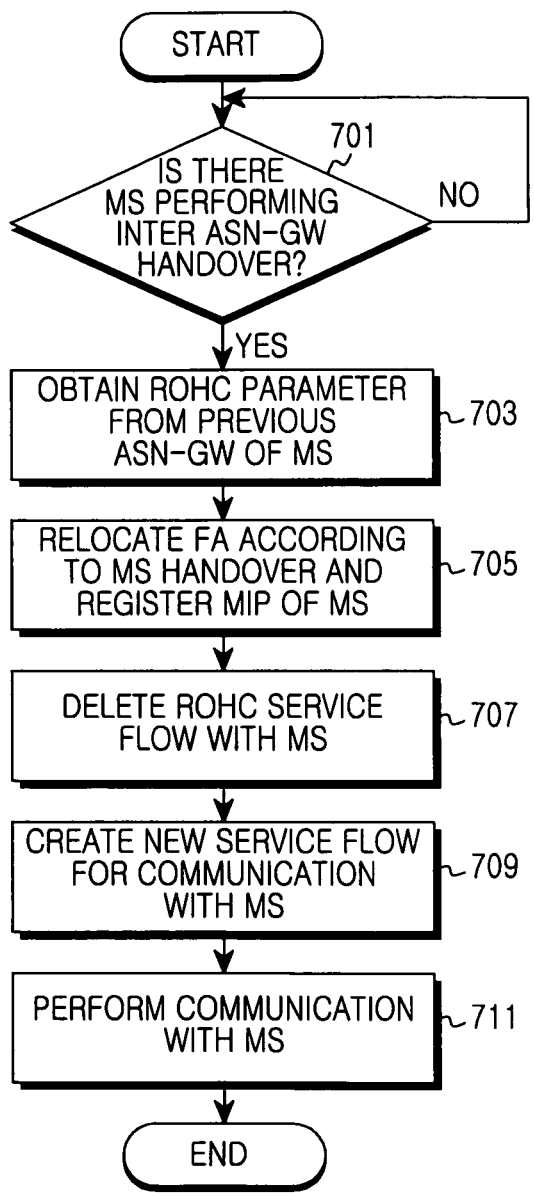
FIG. 7 illustrates a process for supporting a handover of an MS in an ASN-GW unsupporting ROHC, according to an embodiment of the present invention.

For the inter ASN-GW handover, the target ASN-GW that does not support ROHC operates as illustrated in FIG. 7.

FIG. 7 illustrates a process for supporting a handover of an MS in an ASN-GW that does not support ROHC, according to an embodiment of the present invention.

Referring to FIG. 7, in block 701, the ASN-GW determines whether there is an MS performing an inter ASN-GW handover to access a BS controlled by the ASN-GW itself.

If there is an MS performing the inter ASN-GW handover, the ASN-GW proceeds to block 703. In block 703, the ASN-GW detects an ROHC parameter used by a serving ASN-GW for ROHC-based communication with the MS. For example, the ASN-GW obtains the ROHC parameter from the serving ASN-GW as illustrated in FIG. 6.

After obtaining the ROHC parameter, the ASN-GW proceeds to block 705. In block 705, the ASN-GW performs FA relocation and MIP registration of the MS according to an inter ASN-GW handover of the MS. For example, the ASN-GW performs the FA relocation and the MIP registration of the MS as illustrated in the process from the FA relocation request message 627 to the data path establishment completion message 637 of FIG. 6.

Thereafter, in block 707, the ASN-GW deletes an ROHC service flow with the MS because it does not support ROHC.

After deleting the ROHC service flow, the ASN-GW proceeds to block 709. In block 709, the ASN-GW creates a new service flow for communication with the MS.

Thereafter, in block 711, the ASN-GW communicates with the MS by using the new service flow.

As described above, the target ASN-GW performs a control operation for deleting an ROHC service flow with the MS. The MS operates as illustrated in FIG. 8.

Figure 8:
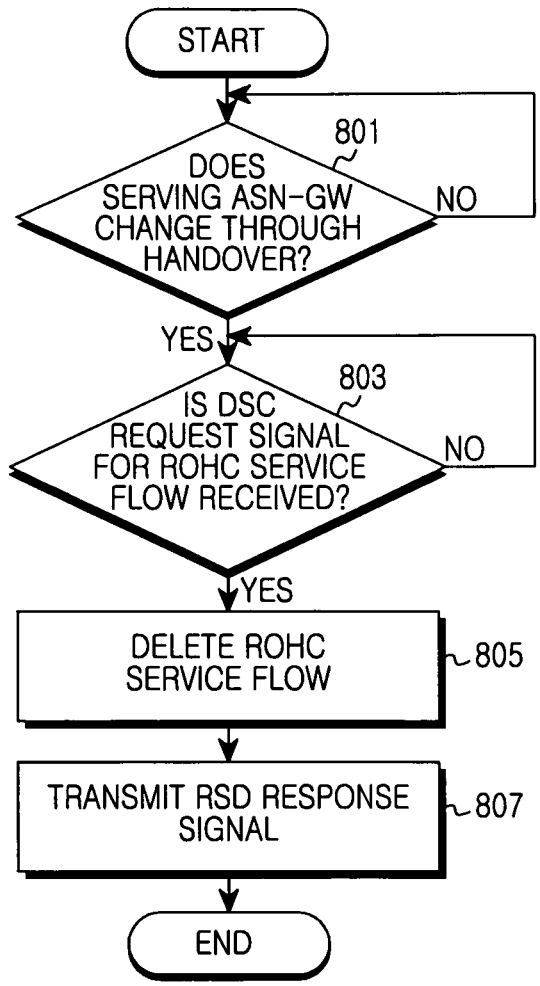
FIG. 8 illustrates a process for a handover of an MS to an ASN-GW unsupporting ROHC, according to an embodiment of the present invention.

FIG. 8 illustrates a process for a handover of an MS to an ASN-GW unsupporting ROHC, according to an embodiment of the present invention.

Referring to FIG. 8, in block 801, the MS determines whether an ASN-GW changes through a handover. That is, the MS determines whether an ASN-GW controlling a serving BS is different from an ASN-GW controlling a target BS.

If an ASN-GW controlling a serving BS is different from an ASN-GW controlling a target BS, the MS determines that an ASN-GW changes through the handover. In block 803, the MS determines whether a dynamic service deletion request signal for an ROHC service flow is received from the target BS.

If a dynamic service deletion request signal for an ROHC service flow is received from the target BS, the MS proceeds to block 805. In block 805, the MS deletes the ROHC service flow.

After deleting the ROHC service flow, the MS proceeds to block 807. In block 807, the MS transmits a dynamic service deletion response message (DSD-RSP) to the target BS.

Thereafter, the MS ends the process.

As described above, the MS creates a new service flow for communication with the target ASN-GW after deleting the ROHC service flow.

In the above embodiment, when the MS performs an inter ASN-GW handover, the serving ASN-GW transmits an ROHC parameter to the target ASN-GW such that the target ASN-GW and the MS can perform ROHC-based communication.

Figure 9:
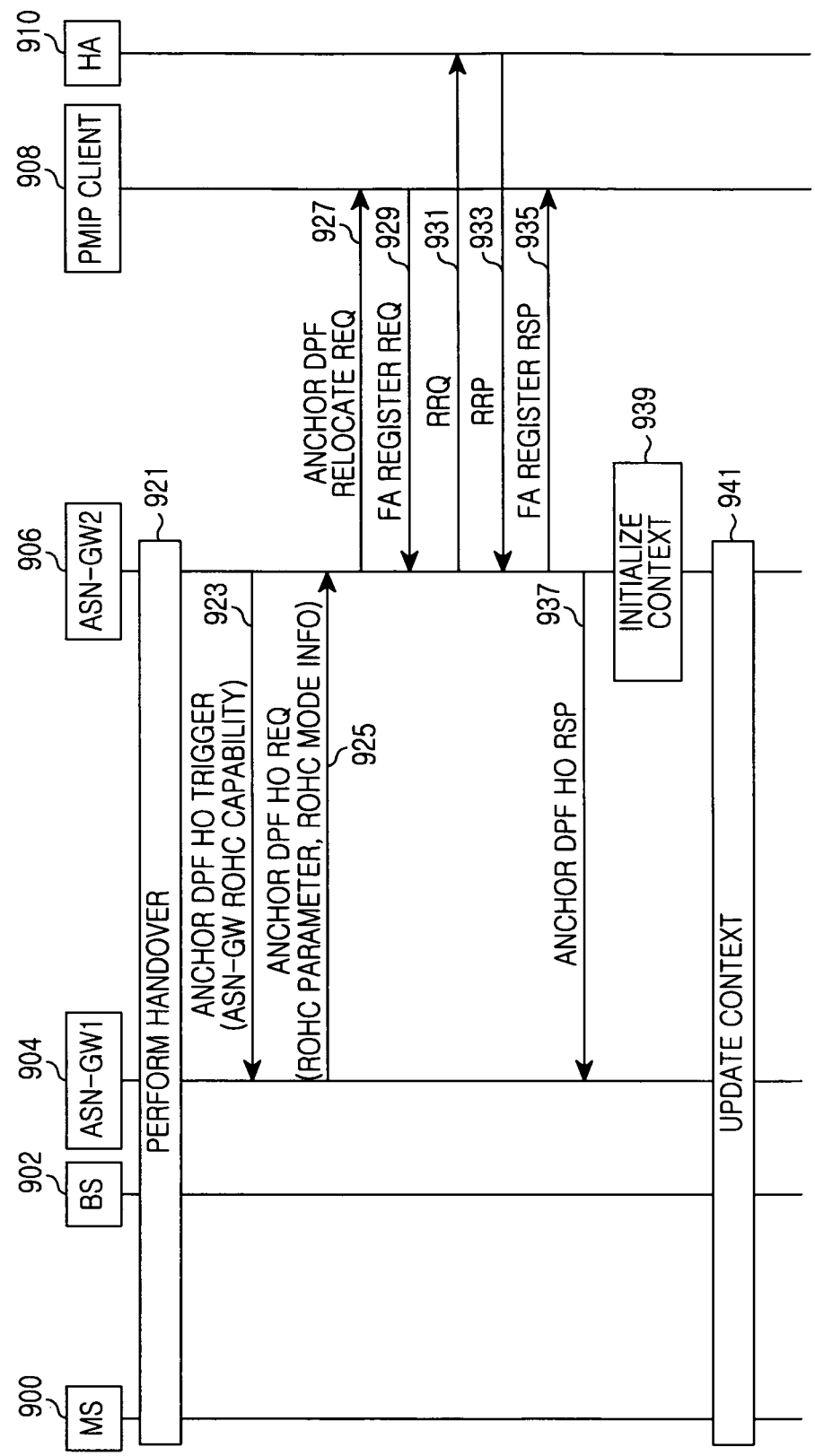
FIG. 9 illustrates an inter ASN-GW handover process in a wireless communication system according to an embodiment of the present invention.

In an embodiment, as illustrated in FIG. 9, the serving ASN-GW may transmit ROHC mode information to the target ASN-GW such that the target ASN-GW and the MS can perform ROHC-based communication. Herein, only when the serving ASN-GW and the target ASN-GW have the same ROHC capability can they operate as illustrated in FIG. 9.

FIG. 9 illustrates an inter ASN-GW handover process in a wireless communication system according to an embodiment of the present invention.

Referring to FIG. 9, an MS 900 is handed over from a BS controlled by a first ASN-GW 904 to a BS 902 controlled by a second ASN-GW 906 (block 921). That is, the MS 900 performs an inter ASN-GW handover. Herein, the first ASN-GW 904 is a serving ASN-GW and the second ASN-GW 906 is a target ASN-GW.

The second ASN-GW 906 transmits an inter-ASN handover trigger message (Anchor_DPF_HO_Trigger 923) to the first ASN-GW 904 for foreign agent (FA) relocation or data path establishment with a home agent (HA) 910. Herein, the inter-ASN handover trigger message includes ROHC capability information of the second ASN-GW 906.

According to the inter-ASN handover trigger message, the first ASN-GW 904 transmits an inter-ASN handover request message (Anchor_DPF_HO_Req 925) to the second ASN-GW 906. Herein, the inter-ASN handover request message includes ROHC mode information and ROHC parameters used for ROHC with the MS 900. For example, the inter-ASN handover request message includes ROHC mode information as illustrated in FIG. 6.

Upon receiving the inter-ASN handover request message, the second ASN-GW 906 transmits a FA relocation request message (Anchor_DPF_Relocate_Req 927) to a proxy mobile IP (PMIP) client 908 for FA relocation. Herein, the FA relocation request message includes the care of address (CoA) of the first ASN-GW 904 and the CoA of the second ASN-GW 906.

On the basis of the CoA of the first ASN-GW 904 included in the FA relocation request message, the PMIP client 908 determines whether to accept the FA relocation request of the second ASN-GW 906. If accepting the FA relocation request of the second ASN-GW 906, the PMIP client 908 transmits an FA registration request message (FA_Register_Req 929) to the second ASN-GW 906.

According to the FA registration request message, the second ASN-GW 906 transmits a registration request message (RRQ 931) to the HA 910 for MIP registration of the MS 900.

The HA 910 transmits a registration reply message (RRP 933) to the second ASN-GW 906 in order to notify a new MIP registration to the second ASN-GW 906.

The second ASN-GW 906 transmits an FA registration response message (FA Register Rsp 935) including the registration reply message to the PMIP client 908. Herein, the PMIP client 908 stores a new FA, detected from the FA registration response message, in its own database.

Also, when the registration reply message is received, the second ASN-GW 906 transmits a data path establishment completion message (Anchor_DPF_HO_Rsp 937) to the first ASN-GW 904. Herein, through the data path establishment completion message, the second ASN-GW 906 notifies the success/failure of data path establishment to the first ASN-GW 904.

Thereafter, the second ASN-GW 906 initializes the context information by using the ROHC mode information received from the first ASN-GW 904 (block 939). For example, if the second ASN-GW 906 operates as a header compressor, the second ASN-GW 906 may operate in an initialization and refresh (IR) state, a first order (FO) state, and a second order (SO) state. If the second ASN-GW 906 initializes the context information, the second ASN-GW 906 operates in an IR state. If the second ASN-GW 906 operates as a header decompressor, the second ASN-GW 906 may operate in a no-context state, a static-context state, and a full-context state. If the second ASN-GW 906 initializes the context information, the second ASN-GW 906 operates in a no-context state.

After initializing the context information, the second ASN-GW 906 updates the context information through communication with the MS 900 (block 941). Thereafter, the second ASN-GW 906 and the MS 900 perform communication by using the updated context information.

In the above embodiment, the serving ASN-GW transmits ROHC mode information to the target ASN-GW. Herein, the ROHC mode information includes ROHC mode information used by the serving ASN-GW, among the bidirectional reliable (R) mode, the bidirectional optimistic (O) mode and the unidirectional (U) mode for ROHC. Herein, the U mode means an ROHC mode that has only a unidirectional packet path for packet transmission from a header compressor to a header decompressor. Since the header decompressor cannot notify the error detection result to the header compressor, the header compressor refreshes the context periodically.

The O mode means an ROHC mode that can transmit ACK information for context update and error recovery requests from a header decompressor to a header compressor. The O mode can minimize the use of a feedback channel transmitted from the header decompressor to the header compressor.

The R mode means an ROHC mode that maximizes the use of a feedback channel. The R mode does not lose context synchronization if a link error does not exceed a predetermined level.

Figure 10:
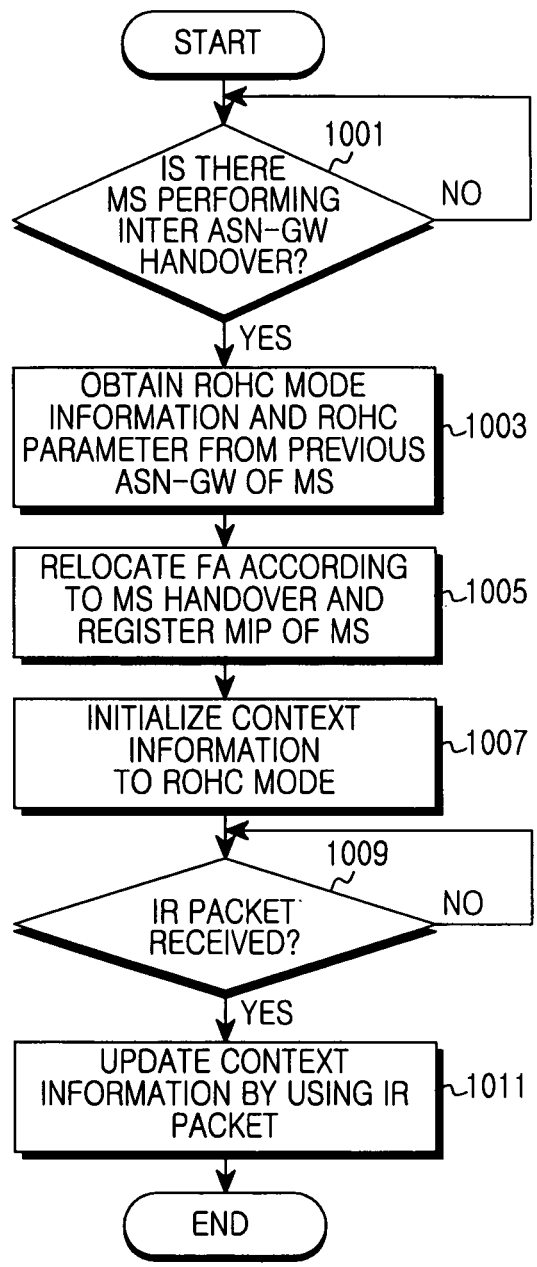
FIG. 10 illustrates a process for updating context information in an ASN-GW according to an embodiment of the present invention.

In the above embodiment, if the second ASN-GW 906 operates as a header decompressor of the U mode, the second ASN-GW 906 operates as illustrated in FIG. 10.

FIG. 10 illustrates a process for updating context information in an ASN-GW according to an embodiment of the present invention.

Referring to FIG. 10, in block 1001, the ASN-GW determines whether there is an MS performing an inter ASN-GW handover to access a BS controlled by the ASN-GW itself.

If there is an MS performing the inter ASN-GW handover, the ASN-GW proceeds to block 1003. In block 1003, the ASN-GW detects ROHC mode information of a serving ASN-GW and an ROHC parameter used by the serving ASN-GW for ROHC-based communication with the MS. For example, the ASN-GW obtains the ROHC mode information and the ROHC parameter from the serving ASN-GW as illustrated in FIG. 9.

After detecting the ROHC parameter and the ROHC mode information of the serving ASN-GW, the ASN-GW proceeds to block 1005. In block 1005, the ASN-GW performs FA relocation and MIP registration of the MS according to an inter ASN-GW handover of the MS. For example, the ASN-GW performs the FA relocation and the MIP registration of the MS as illustrated in the process from the FA relocation request message 927 to the data path establishment completion message 937 of FIG. 9.

Thereafter, in block 1007, the ASN-GW initializes the context by using the ROHC mode information of the serving ASN-GW.

After initializing the context, the ASN-GW proceeds to block 1009. In block 1009, the ASN-GW determines whether an IR packet is received from the MS operating as a header compressor. Herein, the IR packet means a packet that is used to transmit static/dynamic field information necessary for context initialization and header compression/decompression.

If an IR packet is received from the MS, the ASN-GW proceeds to block 1011. In block 1011, the ASN-GW updates the context information by using the information included in the IR packet.

Thereafter, the ASN-GW ends the process.

Figure 11:
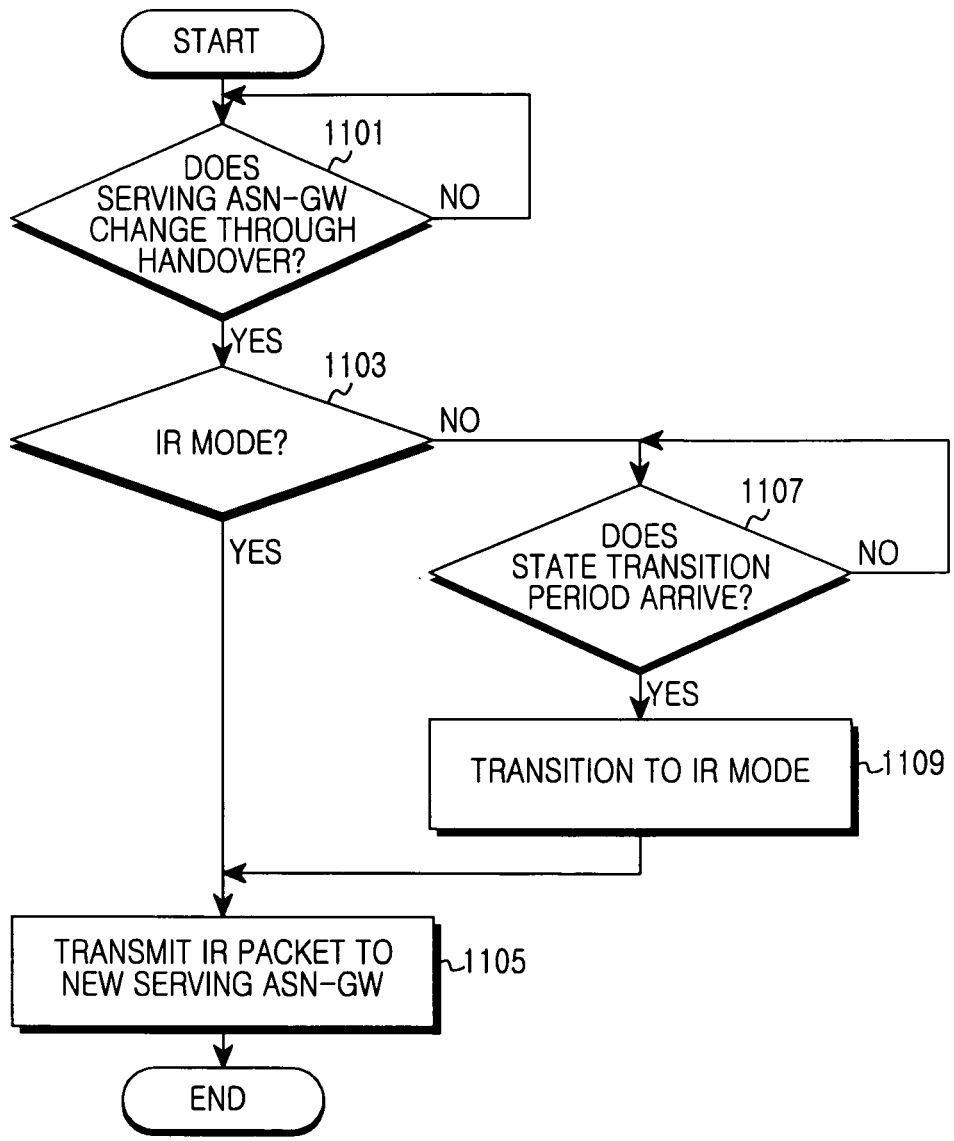
FIG. 11 illustrates a process for updating context information of a serving ASN-GW in an MS according to an embodiment of the present invention.

If the target ASN-GW operates as a header decompressor of the U mode as described above, the MS operating as a header compressor operates as illustrated in FIG. 11.

FIG. 11 illustrates a process for updating context information of a serving ASN-GW in an MS according to an embodiment of the present invention.

Referring to FIG. 11, in block 1101, the MS determines whether an ASN-GW changes through a handover. That is, the MS determines whether an ASN-GW controlling a serving BS is different from an ASN-GW controlling a target BS.

If an ASN-GW controlling a serving BS is different from an ASN-GW controlling a target BS, the MS determines that an ASN-GW changes through the handover. In block 1103, the MS determines whether the ROHC mode is an IR mode.

If it operates in an IR mode, the MS proceeds to block 1105. In block 1105, the MS transmits an IR packet to a new serving ASN-GW. Herein, the new serving ASN-GW means a target ASN-GW.

On the other hand, if it does not operate in an IR mode, the MS proceeds to block 1107. In block 1107, the MS determines whether a state transition period arrives.

If a state transition period arrives, the MS proceeds to block 1109. In block 1109, the MS transitions to an IR mode.

Thereafter, the MS proceeds to block 1105. In block 1105, the MS transmits an IR packet to the new serving ASN-GW.

Thereafter, the MS ends the process.

Figure 12:
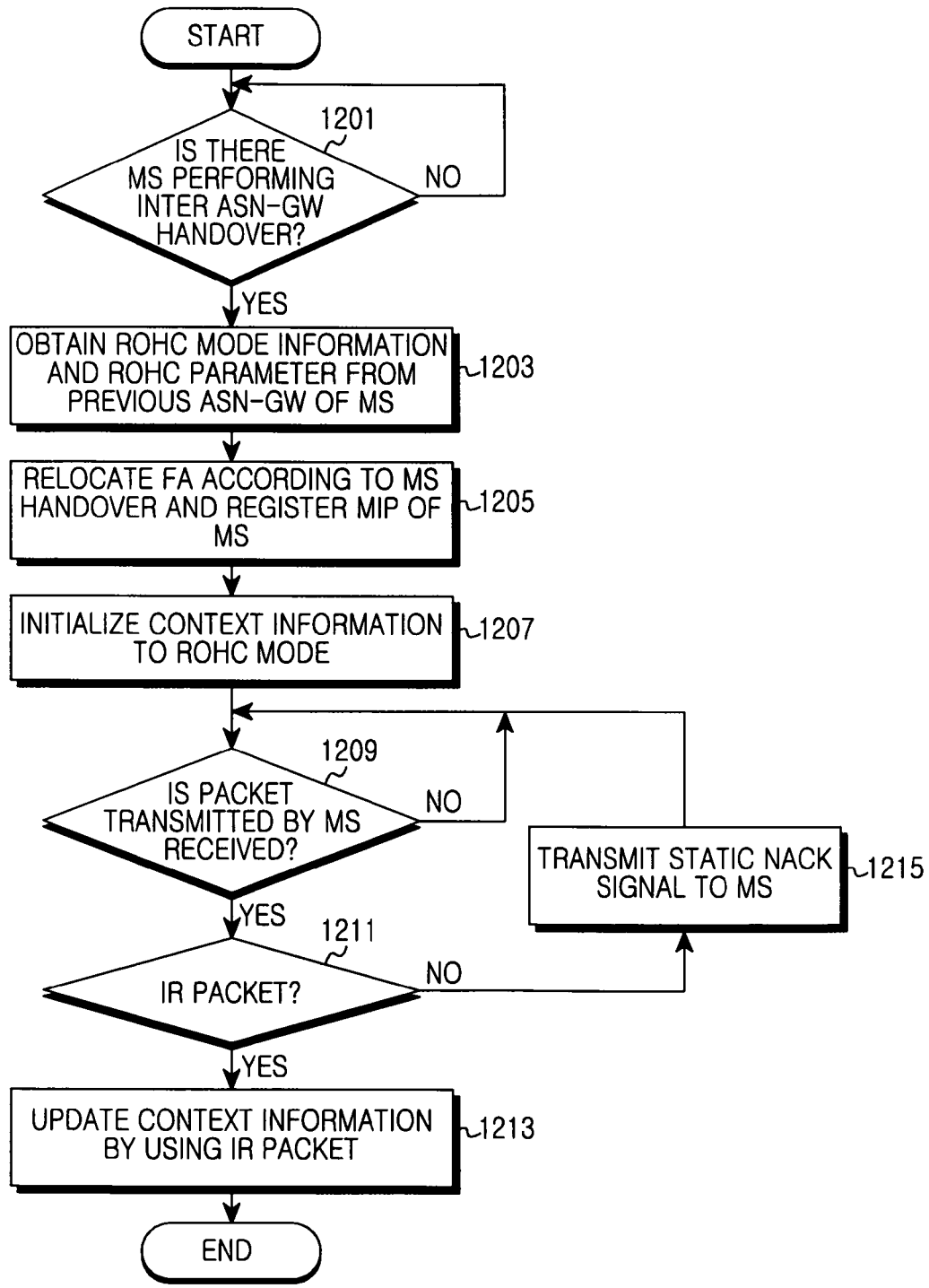
FIG. 12 illustrates a process for updating context information in an ASN-GW according to an embodiment of the present invention.

If the ASN-GW operates as a header decompressor of the O or R mode, the ASN-GW operates as illustrated in FIG. 12.

FIG. 12 illustrates a process for updating context information in an ASN-GW according to an embodiment of the present invention.

Referring to FIG. 12, in block 1201, the ASN-GW determines whether there is an MS performing an inter ASN-GW handover to access a BS controlled by the ASN-GW itself.

If there is an MS performing the inter ASN-GW handover, the ASN-GW proceeds to block 1203. In block 1203, the ASN-GW detects ROHC mode information of a serving ASN-GW and an ROHC parameter used by the serving ASN-GW for ROHC-based communication with the MS. For example, the ASN-GW obtains the ROHC mode information and the ROHC parameter from the serving ASN-GW as illustrated in FIG. 9.

After detecting the ROHC parameter and the ROHC mode information of the serving ASN-GW, the ASN-GW proceeds to block 1205. In block 1205, the ASN-GW performs FA relocation and MIP registration of the MS according to an inter ASN-GW handover of the MS. For example, the ASN-GW performs the FA relocation and the MIP registration of the MS as illustrated in the process from the FA relocation request message 927 to the data path establishment completion message 937 of FIG. 9.

Thereafter, in block 1207, the ASN-GW initializes the context by using the ROHC mode information of the serving ASN-GW.

After initializing the context, the ASN-GW proceeds to block 1209. In block 1209, the ASN-GW determines whether a packet is received from the MS operating as a header compressor.

If a packet is received from the MS, the ASN-GW proceeds to block 1211. In block 1211, the ASN-GW determines whether the received packet is an IR packet. Herein, the IR packet means a packet that is used to transmit static/dynamic field information necessary for context initialization and header compression/decompression.

If the received packet is an IR packet, the ASN-GW proceeds to block 1213. In block 1213, the ASN-GW updates the context information by using the information included in the IR packet.

On the other hand, if the received packet is not an IR packet, the ASN-GW proceeds to block 1215. In block 1215, the ASN-GW transmits a static NACK signal to the MS.

Thereafter, in block 1209, the ASN-GW determines whether a packet is received from the MS.

Figure 13:
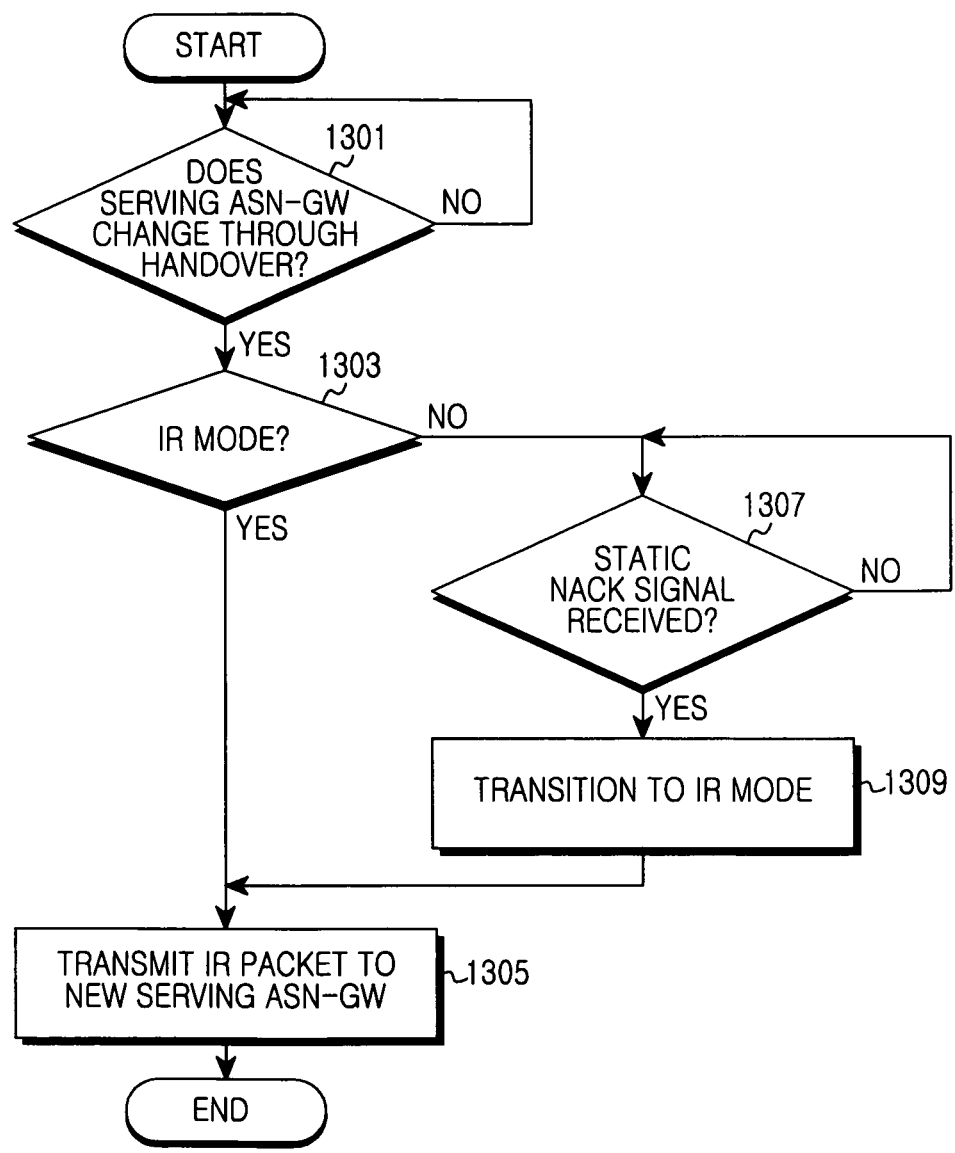
FIG. 13 illustrates a process for updating context information of a serving ASN-GW in an MS according to an embodiment of the present invention.

If the target ASN-GW operates as a header decompressor of the O or R mode as described above, the MS operating as a header compressor operates as illustrated in FIG. 13.

FIG. 13 illustrates a process for updating context information of a serving ASN-GW in an MS according to an embodiment of the present invention.

Referring to FIG. 13, in block 1301, the MS determines whether an ASN-GW changes through a handover. That is, the MS determines whether an ASN-GW controlling a serving BS is different from an ASN-GW controlling a target BS.

If an ASN-GW controlling a serving BS is different from an ASN-GW controlling a target BS, the MS determines that an ASN-GW changes through the handover. In block 1303, the MS determines whether the ROHC mode is an IR mode.

If it operates in an IR mode, the MS proceeds to block 1305. In block 1305, the MS transmits an IR packet to a new serving ASN-GW. Herein, the new serving ASN-GW means a target ASN-GW.

On the other hand, if it does not operate in an IR mode, the MS proceeds to block 1307. In block 1307, the MS determines whether a static NACK signal is received from the new serving ASN-GW.

If a static NACK signal is received from the new serving ASN-GW, the MS proceeds to block 1309. In block 1309, the MS transitions to an IR mode.

Thereafter, the MS proceeds to block 1305. In block 1305, the MS transmits an IR packet to the new serving ASN-GW.

Thereafter, the MS ends the process.

Figure 14:
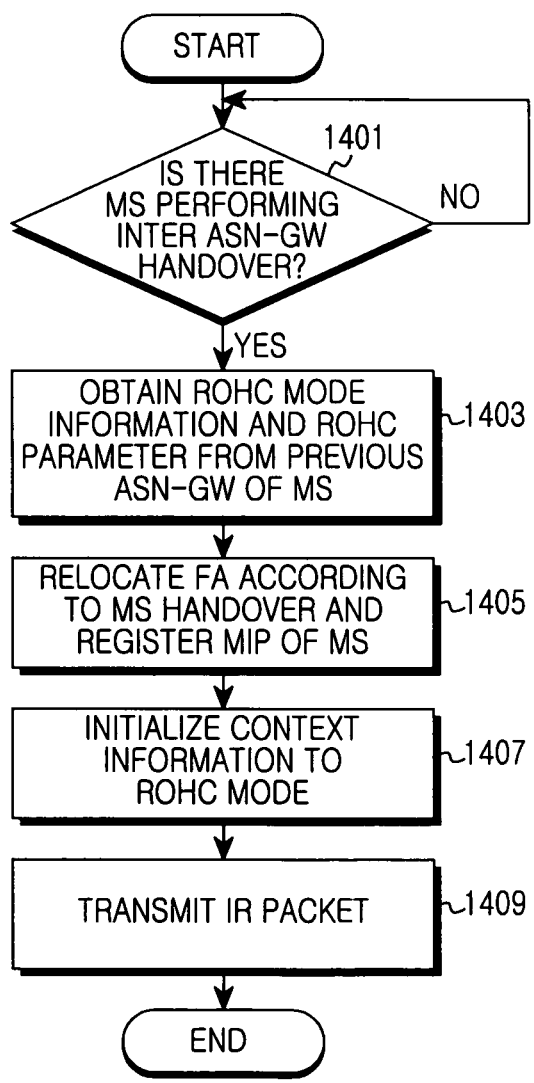
FIG. 14 illustrates a process for updating context information of an MS in an ASN-GW according to an embodiment of the present invention.

If the ASN-GW operates as a header compressor, the ASN-GW operates as illustrated in FIG. 14.

FIG. 14 illustrates a process for updating context information of an MS in an ASN-GW according to an embodiment of the present invention.

Referring to FIG. 14, in block 1401, the ASN-GW determines whether there is an MS performing an inter ASN-GW handover to access a BS controlled by the ASN-GW itself.

If there is an MS performing the inter ASN-GW handover, the ASN-GW proceeds to block 1403. In block 1403, the ASN-GW detects ROHC mode information of a serving ASN-GW and an ROHC parameter used by the serving ASN-GW for ROHC-based communication with the MS. For example, the ASN-GW obtains the ROHC mode information and the ROHC parameter from the serving ASN-GW as illustrated in FIG. 9.

After detecting the ROHC parameter and the ROHC mode information of the serving ASN-GW, the ASN-GW proceeds to block 1405. In block 1405, the ASN-GW performs FA relocation and MIP registration of the MS according to an inter ASN-GW handover of the MS. For example, the ASN-GW performs the FA relocation and the MIP registration of the MS as illustrated in the process from the FA relocation request message 927 to the data path establishment completion message 937 of FIG. 9.

Thereafter, in block 1407, the ASN-GW initializes the context by using the ROHC mode information of the serving ASN-GW.

After initializing the context, the ASN-GW proceeds to block 1409. In block 1409, the ASN-GW transmits an IR packet to the MS operating as a header decompressor. Herein, the IR packet means a packet that is used to transmit static/dynamic field information necessary for context initialization and header compression/decompression.

Thereafter, the ASN-GW ends the process.

Figure 15:
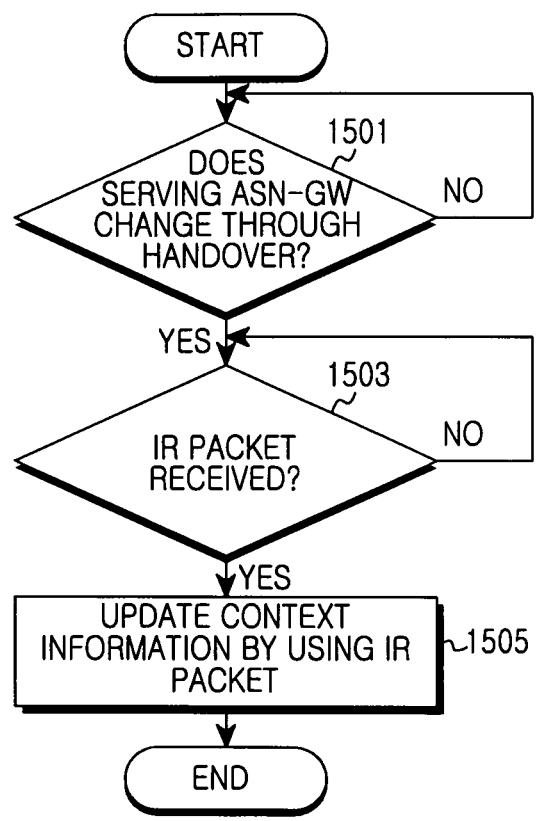
FIG. 15 illustrates a process for updating context information in an MS according to an embodiment of the present invention.

If the target ASN-GW operates as a header compressor as described above, the MS operating as a header decompressor operates as illustrated in FIG. 15.

FIG. 15 illustrates a process for updating context information in an MS according to an embodiment of the present invention.

Referring to FIG. 15, in block 1501, the MS determines whether an ASN-GW changes through a handover. That is, the MS determines whether an ASN-GW controlling a serving BS is different from an ASN-GW controlling a target BS.

If an ASN-GW controlling a serving BS is different from an ASN-GW controlling a target BS, the MS determines that an ASN-GW changes through the handover. In block 1503, the MS determines whether an IR packet is received from the target ASN-GW operating as a header compressor.

If an IR packet is received from the target ASN-GW, the MS proceeds to block 1505. In block 1505, the MS updates the context information by using the information included in the received IR packet.

Thereafter, the MS ends the process.

Figure 16:
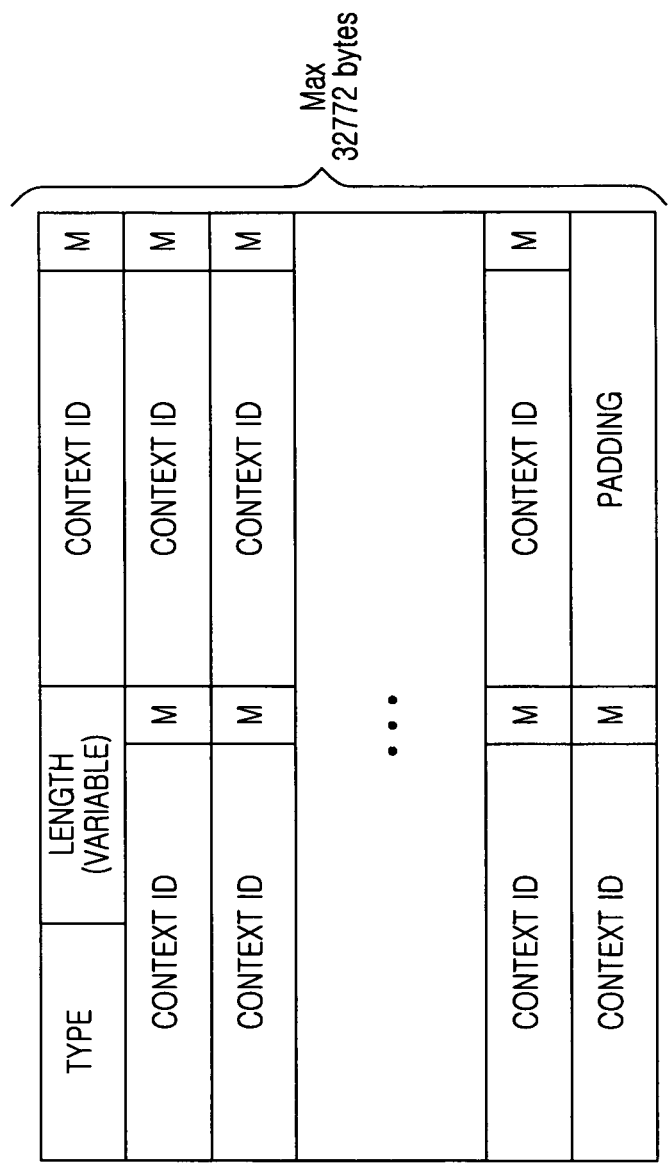
FIG. 16 illustrates the architecture of ROHC mode information according to an embodiment of the present invention.

FIG. 16 illustrates the architecture of ROHC mode information according to an embodiment of the present invention.

Referring to FIG. 16, the ROHC mode information includes Type Field, Length Field, Context ID Field, and Mode (M) Field.

If up to 16,384 contexts are available for each ROHC channel, the ROHC mode information includes 2-bit mode information and 14-bit context ID for each context.

As described above, for an inter ASN-GW handover of an MS in a wireless communication system, the present invention supports the ROHC of the MS without exchange of context information, thereby making it possible to reduce a resource loss according to context information transmission. Also, the present invention supports a handover between ASN-GWs with different ROHC capabilities, thereby making it possible to provide a seamless service to the MS.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method for supporting robust header compression (ROHC) in an access service network gateway (ASN-GW) of a wireless communication system, comprising:
   receiving ROHC parameter information from a previous ASN-GW of a mobile station (MS), the ROHC parameter information comprising a first ROHC parameter used by the previous ASN-GW; and
   transmitting a second ROHC parameter to the MS,
   wherein the second ROHC parameter is detail lined based on the first ROHC parameter and is used to generate new context information.

2. The method of claim 1, further comprising:
   determining whether to relocate a foreign agent (FA) based on an address of the ASN-GW and an address of the previous ASN-GW after receiving the ROHC parameter information; and
   registering a mobile IF (MIP) of the MS to the FA if determining the relocation of the FA, wherein the ROHC is determined after the registration of the MIP of the MS.

3. The method of claim 1, wherein transmitting the second ROHC parameter to the MS comprises transmitting a dynamic service change request message including the second ROHC parameter to the MS through the BS,
   wherein the BS is a BS controlled by the ASN-GW accessed by the MS through a handover.

4. The method of claim 1, further comprising:
   determining whether traffic communicated with the MS occurs when a path modification response message is received from a BS after transmitting the second ROHC parameter to the MS;
   creating a context on the basis of the second ROHC parameter if traffic communicated with the MS occurs; and
   communicating traffic with the MS on the basis of the created context.

5. The method of claim 4, further comprising determining whether the second ROHC parameter is accepted by the MS, based on information included in the dynamic service change response message if a dynamic service change response message is received at the BS from the MS after the second ROHC parameter is transmitted to the MS,
   wherein whether the traffic communicated with the MS occurs is determined if the MS accepts the second ROHC parameter.

6. The method of claim 5, further comprising:
   if the MS does not accept the second ROHC parameter:
   deleting an ROHC service flow with the MS, if the MS does not accept the second ROHC parameter; and creating a new service flow for communication with the MS.

7. The method of claim 1, further comprising determining whether the ROHC is supportable by the ASN-GW before receiving the ROHC parameter information,
   wherein the ROHC is determined after receiving the ROHC parameter information if the ROHC is supportable.

8. The method of claim 7, further comprising:
   deleting an ROHC service flow with the MS after receiving the ROHC parameter information, if the ROHC is not supportable; and
   creating a new service flow for communication with the MS.

9. A method for supporting robust header compression (ROHC) in a mobile station (MS) when an access service network gateway (ASN-GW) is changed through a handover in a wireless communication system, comprising:
   receiving an ROHC parameter for an ROHC service flow from a base station (BS);
   resetting context information for ROHC based on the received ROHC parameter,
   wherein the received ROHC parameter is used to generate new context information.

10. The method of claim 9, further comprising: determining whether to accept the ROHC parameter, and
    determining whether context information for ROHC is resetting based on the determined result,
    wherein the context information is reset if the ROHC parameter is accepted.

11. The method of claim 10, wherein the ROHC parameter is received through a dynamic service change request message for the ROHC service flow, and
    wherein a dynamic service change response message indicating whether the ROHC parameter is accepted is transmitted.

12. The method of claim 10, wherein if the ROHC parameter is not acceptable, the dynamic service change response message indicating unacceptability of the ROHC parameter is transmitted and the context information is not reset.

13. A wireless communication system for supporting robust header compression (ROHC), comprising:
- a second access service network gateway (ASN-GW) configured to receive first ROHC parameter information from a first ASN-GW if a mobile station (MS) is handed over from a first base station (BS) controlled by the first ASN-GW to a second BS controlled by the second ASN-GW, and transmit a second ROHC parameter to the MS through the second BS,
- the MS configured to receive the second ROHC parameter from the second ASN-GW and reset context information of ROHC based on the second ROHC parameter,
- wherein the second ASN-GW and the MS performs communication by generating a new context on the basis of the second ROHC parameter.

14. The wireless communication system of claim 13, wherein the second ASN-GW determines the second ROHC parameter for communication with the MS based on the first ROHC parameter received from the first ASN-GW and transmits the determined second ROHC parameter to the MS by using a path modification request message for an ROHC service flow.

15. The wireless communication system of claim 13, wherein after receiving the first ROHC parameter information from the first ASN-GW, the second ASN-GW determines whether to relocate a foreign agent (FA) and registers a mobile IP (MIP) of the MS if it is determined to relocate the FA.

16. The wireless communication system of claim 13, wherein after resetting the context information, the MS transmits a dynamic service change response message for the ROHC service flow, that indicates one of acceptability and unacceptability of the second ROHC parameter, to the second BS, wherein the second BS transmits a path modification response message indicating the one of acceptability and unacceptability of the second ROHC parameter to the second ASN-GW.

17. The wireless communication system of claim 13, wherein after receiving the second ROHC parameter, the second ASN-GW determines whether the second ROHC parameter is accepted by the MS, generates a new context information based on the second ROHC parameter if the second ROHC parameter is accepted by the MS, and communicates with the MS by using the new context information.

18. The wireless communication system of claim 17, wherein if the second ROHC parameter is not accepted by the MS, the second ASN-GW deletes an ROHC service flow with the MS, and creates a new service flow for communication with the MS.

19. A method for supporting robust header compression (ROHC) in an access service network gateway (ASN-GW) of a wireless communication system, comprising:
- receiving ROHC mode information and ROHC parameter information from a previous ASN-GW of a mobile station (MS), the ROHC mode information comprising a ROHC mode of the previous ASN-GW;
- initializing context information by using the ROHC mode of the previous ASN-GW; and
- updating the context information through communication with the MS after initializing the context information.

20. The method of claim 19, further comprising:
- determining whether to relocate a foreign agent (FA) after receiving the ROHC mode information and the ROHC parameter information; and
- registering a mobile IP (MIP) of the MS if it is determined to relocate the FA.

21. The method of claim 19, wherein the ROHC mode is one of a unidirectional (U) mode, a bidirectional optimistic (O) mode and a bidirectional reliable (R) mode.

22. The method of claim 19, wherein updating the context information comprises updating the context information through an IR packet received from the MS, if the ASN-GW operates as a decompressor,
- wherein the IR packet includes a static/dynamic field information necessary for header compression and decompression.

23. The method of claim 19, wherein updating the context information comprises transmitting an IR packet to the MS to update the context information of the MS, if the ASN-GW operates as a compressor.

24. The method of claim 1, wherein the ASN-GW does not receive context information for the ROHC from the previous ASN-GW.

25. The wireless communication system of claim 13, wherein the ASN-GW does not receive context information for the ROHC from the previous ASN-GW.

26. The method of claim 19, wherein the ASN-GW does not receive context information for the ROHC from the previous ASN-GW.

* * * * *